United States Patent
Wakabayashi

Patent Number: 5,446,773
Date of Patent: Aug. 29, 1995

[54] FAST REACTOR CORE

[75] Inventor: Toshio Wakabayashi, Higashi, Japan

[73] Assignee: Doryokuro Kakunenryo Kaihatsu Jigyodan, Tokyo, Japan

[21] Appl. No.: 341,972

[22] Filed: Nov. 16, 1994

[30] Foreign Application Priority Data

Nov. 17, 1993 [JP] Japan .................. 5-311190

[51] Int. Cl.6 .............................. G21G 1/02
[52] U.S. Cl. .................. 376/170; 376/173; 376/901
[58] Field of Search ............... 376/170-173, 376/901

[56] References Cited

U.S. PATENT DOCUMENTS

4,657,725  4/1987  Millot .................... 376/173
5,299,241  3/1994  Suzuki et al. ............ 376/170

OTHER PUBLICATIONS

Nuclear Engineering International, vol. 23, No. 266, (Jan. 1978), pp. 40-43, McKay.

Primary Examiner—Behrend E. Harvey
Attorney, Agent, or Firm—Armstrong, Westerman, Hattori, McLeland & Naughton

[57] ABSTRACT

The invention provides a heterogeneously loaded type of fast reactor core in which a reduced number of target fuel assemblies containing minor actinide nuclides are heterogeneously dispersed and loaded. A wrapper tube for each of the target fuel assemblies is of the same shape and size as a hexagonal wrapper tube for an ordinary core fuel assembly. Each of target fuel rods within the wrapper tube contains 20 to 50% of minor actinide nuclides, and has a diameter more reduced than that of an ordinary core fuel rod. The number of the ordinary core fuel rods loaded in the ordinary core fuel assembly is 271 while the number of the target fuel rods loaded in the target fuel assembly is 331 or 397. Thirty to 50 such target fuel assemblies are heterogeneously dispersed and loaded in the fast reactor core.

3 Claims, 5 Drawing Sheets

○ Inner core fuel assembly
◎ Outer core fuel assembly
(P) Main control rods
(B) Backup control rods
(+) Blanket fuel assembly
(⦀) Target fuel assembly ○ Inner core fuel assembly
◎ Outer core fuel assembly
Ⓟ Main control rods
Ⓑ Backup control rods
⊕ Blanket fuel assembly
▦ Target fuel assembly

FAST REACTOR CORE

BACKGROUND OF THE INVENTION

The present invention relates to a fast reactor core in which 30 to 50 target assemblies, each containing 20 to 50% of minor actinide nuclides having long half-lives, are so heterogeneously dispersed and loaded that the minor actinide nuclides can efficiently be burned up with no considerable influence on the core characteristics.

The use of a fast reactor for annihilating minor actinide nuclides of long half-lives that are present in spent nuclear fuel from light-water reactors is now under investigation. These minor actinides, for instance, include neptunium (Np), americium (Am), and curium (Cm). For loading minor actinide nuclides-containing fuel in a reactor core there are two approaches, one called the homogeneous loading of fuel in which small amounts of minor actinide nuclides are homogeneously added to and loaded in all core fuel, and the other referred to as the heterogeneous loading of fuel in which a small number of special fuel assemblies (called the target fuel assemblies) with large amounts of minor actinide nuclides added thereto are loaded in the reactor core.

It has now been found that the homogeneous loading of fuel enables minor actinide nuclides to be annihilated with no serious influence on the core characteristics, if the content of the minor actinide nuclides is reduced to about 5% on the reactor average. Since, of the minor actinide nuclides, americium and curium generate large amounts of neutrons, gamma rays and heat, however, it is required to use thickly shielded cells for fuel fabrication.

On the contrary, the heterogeneous loading of fuel enables the number of minor actinide nuclides-containing fuel elements to be reduced, and so has some merits in view of fuel fabrication and management. When this heterogeneous loading of fuel is used to load in a reactor core target fuel assemblies with high content of minor actinide nuclides (i.e., with minor actinide nuclides contained in them in amounts of 20 to 50% on the assembly average), it has now been found that the nuclear and thermal properties are improved by dispersed fuel loading rather than by concentrated fuel loading.

However, it is expected that the physical properties of minor actinide nuclides would make the melting point and thermal conductivity of fuel containing large amounts of minor actinide nuclides lower than those of ordinary mixed-oxide fuel (MOX). When target fuel assemblies containing minor actinide nuclides are merely loaded by the heterogeneous loading technique, it is expected that the fuel permissible linear power would be exceeded. To avoid this, it is required to lower the operating power and, hence, it is substantially impossible to achieve sufficient annihilation of minor actinide nuclides within the target fuel assembly.

It is thus an object of the present invention to provide a solution to the technical problems as mentioned above by the provision of a fast reactor core in which a reduced number of target assemblies containing large amounts of minor actinide nuclides having long half-lives can be heterogeneously dispersed and loaded to efficiently burn up the large amounts of minor actinide nuclides with no significant influence on the core characteristics.

SUMMARY OF THE INVENTION

According to one aspect of the present invention, there is provided a heterogeneously loaded type of fast reactor core in which a reduced number of target fuel assemblies containing minor actinide nuclides are heterogeneously dispersed and loaded, wherein:
 a wrapper tube for each of said target fuel assemblies is of the same shape and size as a hexagonal wrapper tube for an ordinary core fuel assembly,
 each of target fuel rods within said wrapper tube contains 20 to 50% of minor actinide nuclides, and has a diameter more reduced than that of an ordinary core fuel rod, and
 the number of the ordinary core fuel rods loaded in the ordinary core fuel assembly is 271 while the number of the target fuel rods loaded in the target fuel assembly is 331 or 397,
 30 to 50 such target fuel assemblies being heterogeneously dispersed and loaded in said fast reactor core.

Preferably, the basic material of the fuel containing minor actinide nuclides is a mixed oxide or nitride of uranium and plutonium.

According to another aspect of the present invention, there is provided a heterogeneously loaded type of fast reactor core in which a reduced number of target fuel assemblies containing aluminum oxide, magnesium oxide, aluminum magnesium oxide, cerium oxide, gadolinium oxide, aluminum nitride or zirconium nitride, to which minor actinide nuclides are added, are heterogeneously dispersed and loaded, wherein:
 a wrapper tube for each of said target fuel assemblies is of the same shape and size as a hexagonal wrapper tube for an ordinary core fuel assembly,
 each of target fuel rods within said wrapper tube contains 20 to 50% of minor actinide nuclides, and has a diameter more reduced than that of an ordinary core fuel rod, and
 the number of the ordinary core fuel rods loaded in the ordinary core fuel assembly is 271 while the number of the target fuel rods loaded in the target fuel assembly is 331 or 397,
 30 to 50 such target fuel assemblies being heterogeneously dispersed and loaded in said fast reactor core.

The wrapper tube is of the same shape and size as an ordinary hexagonal core fuel assembly, so that the target assembly can be handled with the use of an ordinary fuel assembly handling machine. The target rods within the wrapper tube contain as high as 20 to 50% of minor actinide nuclides, so the melting point and thermal conductivity of the fuel decrease due to the physical properties of the minor actinide nuclides. According to the present invention, the diameter of the target rods is more reduced than that of an ordinary core fuel rod, thereby increasing the capability to remove heat and, hence, avoiding any decrease in the permissible linear power. This also enables the number of the target rods loaded to be increased, so that the same shape of the assembly can be achieved.

According to the present invention, it is possible to achieve good-enough annihilation of minor actinide nuclides, as is the case with a core with minor actinide nuclides homogeneously added to it. In addition, it is possible to reduce the number of the target assemblies to about 8 to 14% of the number of the core fuel assemblies, thus achieving a great cost reduction regarding fuel fabrication and management.

BRIEF DESCRIPTION OF THE DRAWINGS

The present invention will now be explained, by way of example but not by way of limitation, with reference to the accompanying drawings, in which.

DETAILED DESCRIPTION OF THE EMBODIMENTS

As mentioned above, the present invention relates to a heterogeneously loaded type of fast reactor core in which a reduced number of (e.g., 30 to 50) target fuel assemblies containing minor actinide nuclides are heterogeneously dispersed and loaded. The target fuel rods within each fuel assembly contain 20 to 50% of minor actinide nuclides, and are smaller in diameter than ordinary core fuel rods, so that more target fuel rods can be loaded in the target fuel assembly.

Figure 1:
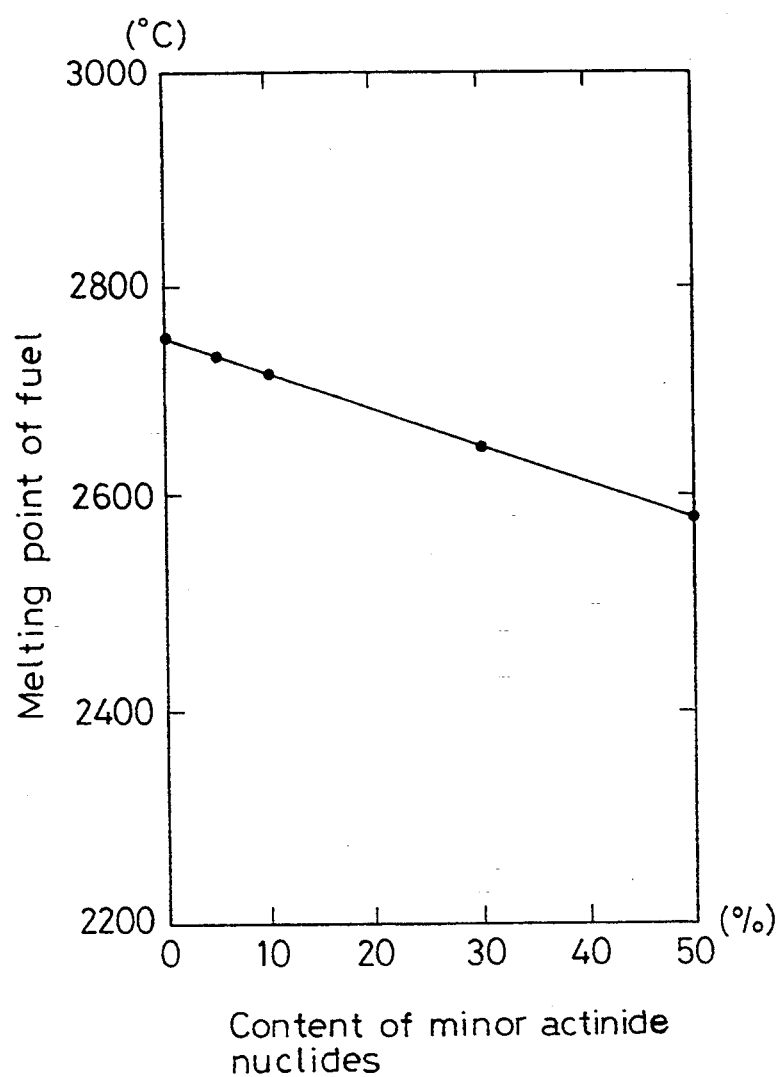
FIG. 1 is a diagram illustrative of the relation between the content of minor actinide nuclides and the melting point of fuel.

Shown in FIG. 1 is the relation between the content of minor actinide nuclides and the melting point of fuel. As the content of minor actinide nuclides increases, the melting point of fuel decreases, and the thermal conductivity of fuel decreases as well. For these reasons, target fuel assemblies containing large amounts of minor actinide nuclides are lower than ordinary core fuel assemblies (i.e., those containing no minor actinide nuclides) in terms of the fuel permissible linear power, i.e., the uppermost linear power with which the fuel does not melt.

Figure 2:
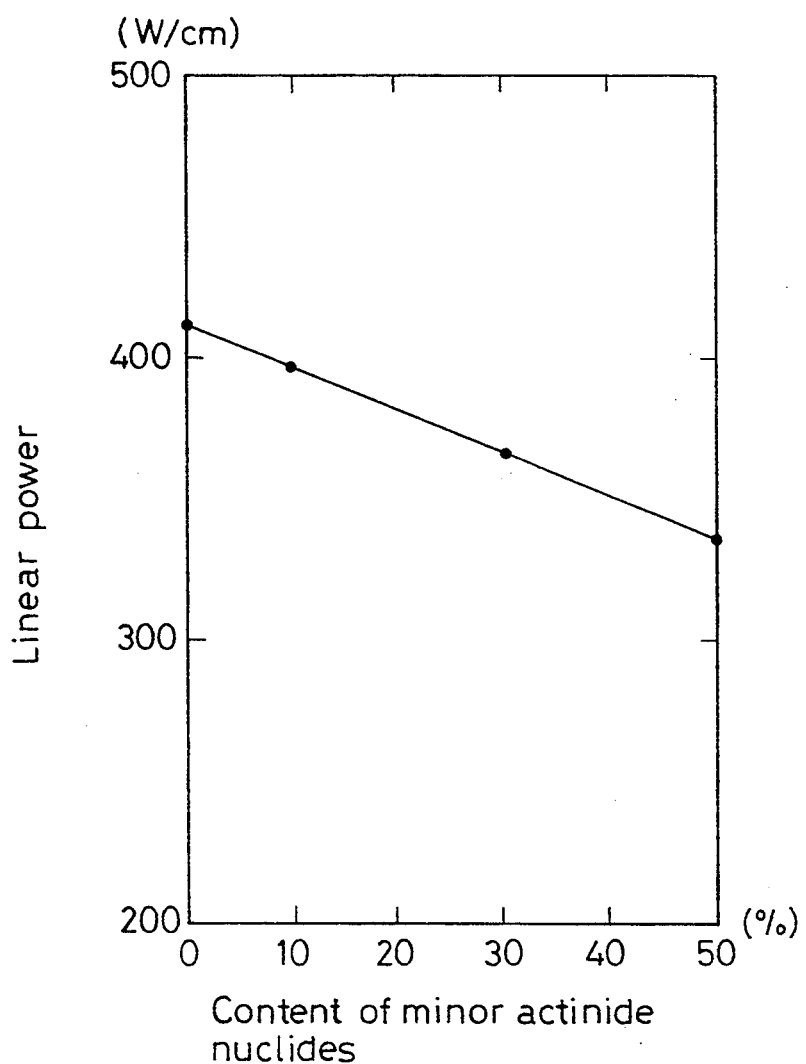
FIG. 2 is a diagram illustrative of the relation between the content of minor actinide nuclides and the permissible linear power.

Shown in FIG. 2 is the relation between the content of minor actinide nuclides and the permissible linear power. For instance, when the content of minor actinide nuclides is 50%, the permissible linear power is about 20% lower than that in the absence of minor actinide nuclides. To avoid a decrease in the permissible linear power, it is required to lower the operating power. It is thus expected that no sufficient annihilation of the minor actinide nuclides would occur in the target fuel assemblies.

According to the present invention, this decrease in the permissible linear power can be avoided by reducing the diameter of target fuel rods so that more target fuel rods can be loaded in a wrapper cylinder or tube of the same hexagonal shape in section as that used with an ordinary core fuel assembly. Characterized by this is the present invention.

Figure 3A:
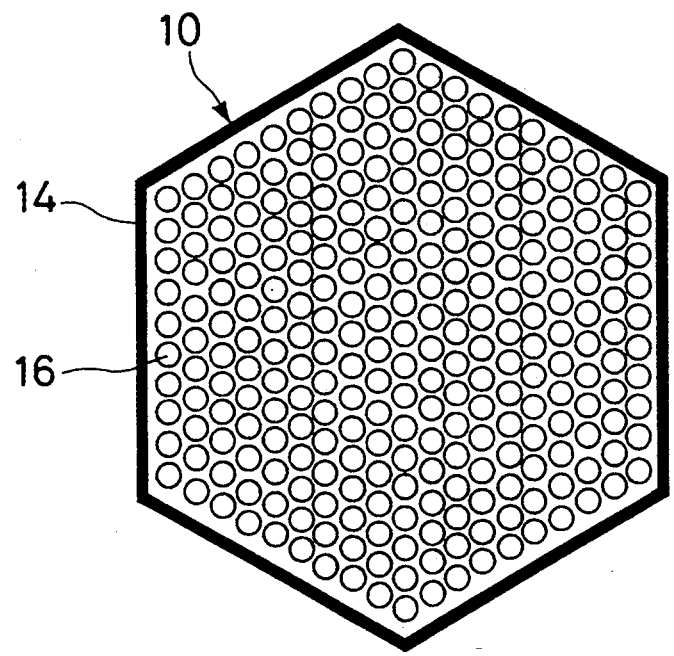
FIG. 3 is a cross-sectional view illustrative of a fuel assembly used in the present invention.
Figure 3B:
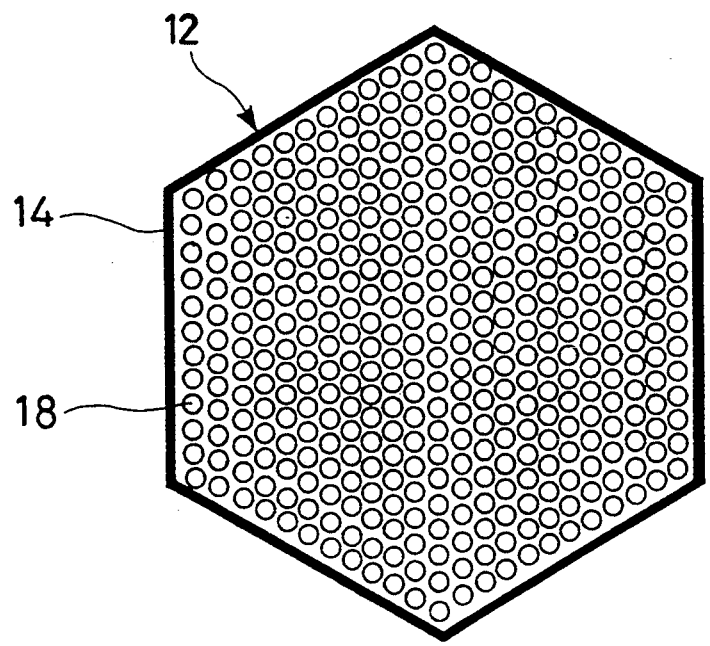

Referring to FIG. 3, there is shown an embodiment of the fuel assembly used in the present invention. FIG. 3A represents a cross-section of an ordinary core fuel assembly 10, while FIG. 3B illustrates a cross-section of a target fuel assembly 12 containing minor actinide nuclides. The ordinary core fuel assembly 10 is of the structure the 271 core fuel rods 16 are regularly loaded in a hexagonal wrapper cylinder or tube 14, whereas the target fuel assembly 12 is of the structure that as many as 397 target fuel rods 18 are regularly loaded in a hexagonal wrapper tube 14 of the same geometry.

Figure 4:
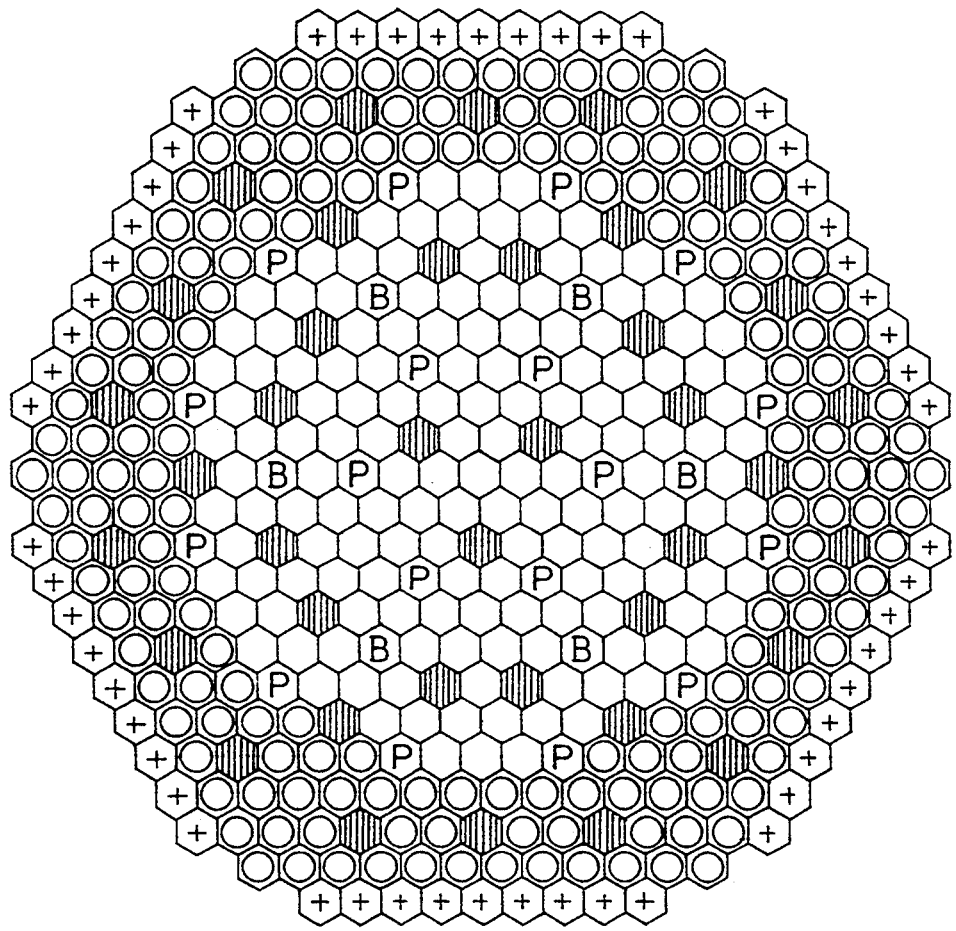
FIG. 4 is a schematic view illustrative of target fuel assemblies located in the reactor core according to the present invention.

Referring then to FIG. 4, there is schematically shown one embodiment of the core arrangement in which such core and target fuel assemblies are loaded. For power flattening, this core arrangement is of a two-zone type wherein plutonium (Pu) is more enriched in the outer zone than in the inner zone. Provided in the inner and outer zones are 154 and 180 core fuel assemblies, respectively, with 39 target fuel assemblies dispersed in these zones. On the outermost side there are provided blanket fuel assemblies. At suitable positions main and backup control rods are located.

Figure 5:
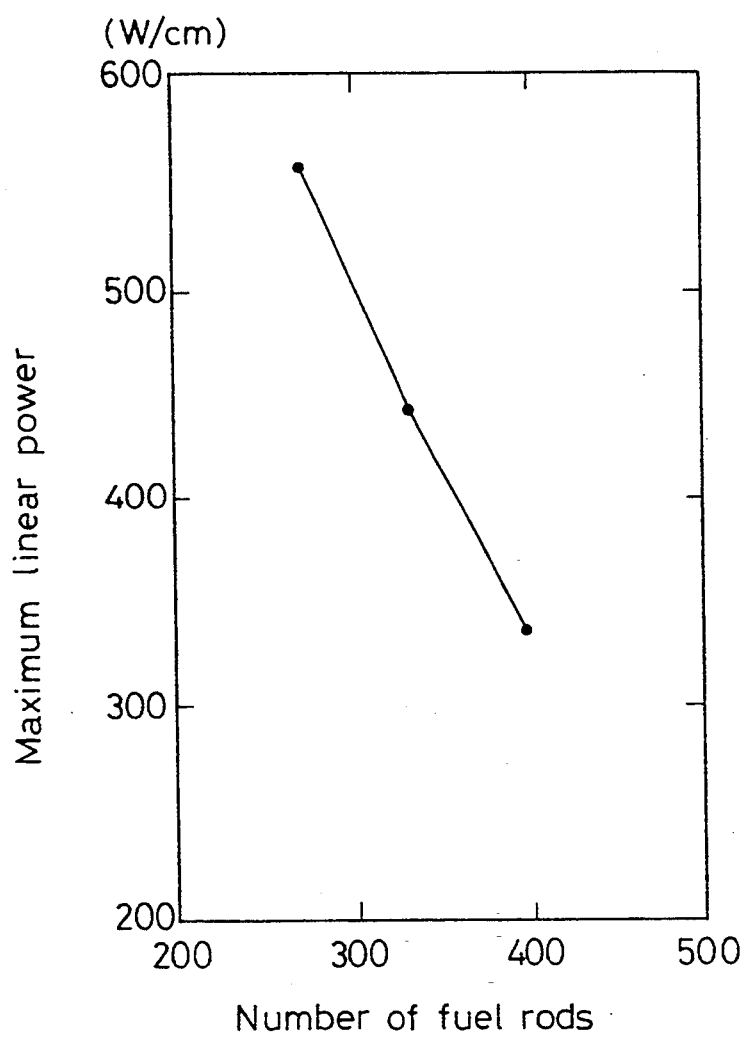
FIG. 5 is a diagram illustrative of the number of fuel rods in a target fuel assembly and the maximum permissible linear power.

Referring to the case where the number of the target fuel rods (containing 50% of minor actinide nuclides) within the target fuel assembly is used as a parameter at such a core arrangement, a change in the maximum linear power is as shown in FIG. 5. The maximum linear power decreases with an increase in the number of the target fuel rods, and becomes lower than the permissible linear power when the number of the target fuel rods loaded within the target fuel assembly reaches 397. Also, the sodium void and Doppler coefficients are equivalent to those of a homogeneous core in which minor actinide nuclides are used at the same content; no problem arises during operation and control. In addition, the rate of annihilation of minor actinide nuclides in the core of the present invention is equivalent to that of a homogeneous core (about 11% per year).

It is here to be noted that when fuel rods are regularly inserted in a hexagonal wrapper tube, it is inevitable that their number take discrete values of, e.g., 127, 217, 271, 331, 397. . . The current standard number of ordinary core fuel rods loaded per ordinary core fuel assembly is set at 271 in view of wrapper tube size and fuel pellet production. On the other hand, all wrapper tubes must be of the same shape, as can be seen from FIG. 4. According to the present invention wherein target fuel rods of reduced diameter can be used, it is thus possible to load as many as 331 or 397 target fuel rods in the same wrapper tube. However, it is to be understood that it is practically impossible to use more target fuel rods, because it is not only required to reduce their diameter further but also some problems arise in connection with mechanical strength.

In the present invention, the basic material of the fuel containing minor actinide nuclides is usually a mixed oxide of uranium and plutonium. However, it is to be understood that the present invention is applicable to a mixed nitride of uranium and plutonium that is superior to the mixed-oxide fuel in terms of the rate of annihilation of minor actinide nuclides.

While the above embodiment has been described as using uranium and plutonium-containing fuel for the target fuel assembly, it is also to be understood that any uranium and plutonium-free fuel can be used as the target fuel assembly. In other words, for the target assembly it is possible to make use of aluminum oxide, magnesium oxide, aluminum magnesium oxide, cerium oxide, gadolinium oxide, aluminum nitride or zirconium nitride, to which minor actinide nuclides are added. This forecloses the possibility of formation of minor actinide nuclides from uranium and plutonium, and so enables minor actinide nuclides to be annihilated with high efficiency.

While the present invention has been particularly shown and described with reference to a preferred embodiment, it will be understood by those skilled in the art that various changes in form and detail may be made therein without departing form the spirit and scope of the invention.

What is claimed is:

1. A heterogeneously loaded fast reactor core comprising a plurality of core fuel assemblies and a plurality of target fuel assemblies, each of said core fuel assemblies comprising a hexagonal wrapper tube and a plurality of core fuel rods positioned within said wrapper tube, each of said core fuel rods having a first predetermined diameter, each of said target fuel assemblies comprising a hexagonal wrapper tube and a plurality of target fuel rods positioned within said wrapper tube, each of said target fuel rods having a second predetermined diameter, each of said target fuel rods containing 20 to 50% of minor actinide nuclides, said second predetermined diameter being smaller than said first predetermined diameter, each of said wrapper tubes of said core fuel assemblies and of said target fuel assemblies, being of the same shape and size, each of said core fuel assemblies having 271 core fuel rods, each of said target fuel assemblies having either 331 or 397 target fuel rods, said fast reactor core having 30 to 50 target fuel assemblies heterogeneously dispersed and loaded therein.

2. The fast reactor core as claimed in claim 1, wherein the basic material of the fuel containing minor actinide nuclides is a mixed oxide or nitride of uranium and plutonium.

3. A heterogeneously loaded fast reactor core comprising a plurality of core fuel assemblies and a plurality of target fuel assemblies, each of said core fuel assemblies comprising a hexagonal wrapper tube and a plurality of core fuel rods positioned within said wrapper tube, each of said core fuel rods having a first predetermined diameter, each of said target fuel assemblies comprising a hexagonal wrapper tube and a plurality of target fuel rods positioned within said wrapper tube, each of said target fuel rods having a second predetermined diameter, each of said target rods containing aluminum oxide, magnesium oxide, aluminum magnesium oxide, cerium oxide, gadolinium oxide, aluminum nitride or zirconium nitride, to which 20 to 50% of minor actinide nuclides are added.

said second predetermined diameter being smaller than said first predetermined diameter, each of said wrapper tubes of said core fuel assemblies and of said target fuel assemblies, being of the same shape and size, each of said core fuel assemblies having 271 core fuel rods, each of said target fuel assemblies having either 331 or 397 target fuel rods, said fast reactor core having 30 to 50 target fuel assemblies heterogeneously dispersed and loaded therein.

* * * * *